United States Patent [19]

Schreuders et al.

[11] 4,447,269

[45] May 8, 1984

[54] CATIONIC AQUEOUS BITUMINOUS EMULSION-AGGREGATE SLURRIES

[75] Inventors: Hans G. Schreuders; Peter Schilling, both of Charleston, S.C.

[73] Assignee: Westvaco Corporation, New York, N.Y.

[21] Appl. No.: 397,911

[22] Filed: Jul. 13, 1982

[51] Int. Cl.³ .............................................. C08L 95/00
[52] U.S. Cl. ............................... 106/277; 106/273 N; 106/281 R; 106/281 N; 252/311.5; 208/44
[58] Field of Search ............... 106/277, 281 R, 273 N, 106/281 N; 252/311.5; 208/44

[56] References Cited

U.S. PATENT DOCUMENTS

| | | | |
|---|---|---|---|
| 2,966,478 | 12/1960 | Harrison | 260/47 |
| 3,423,221 | 1/1969 | Borgfeldt | 106/277 |
| 3,615,796 | 10/1971 | Schreuders | 106/277 |
| 3,753,968 | 8/1973 | Ward | 260/97.6 |
| 3,764,359 | 10/1973 | Dybalski | 106/280 |
| 3,859,227 | 1/1975 | Dwyer | 252/311.5 |
| 3,899,476 | 8/1975 | Ward | 260/97.5 |
| 4,013,601 | 3/1977 | Alford | 260/18 |
| 4,081,462 | 3/1978 | Powers et al. | 260/501.1 |
| 4,184,866 | 1/1980 | Dellicolli et al. | 71/65 |
| 4,338,136 | 7/1982 | Goullet et al. | 106/273 |
| 4,381,194 | 4/1983 | Dellicolli et al. | 71/65 |

FOREIGN PATENT DOCUMENTS 1046208 10/1966 United Kingdom .

OTHER PUBLICATIONS

Falkehag et al., Chromophores in Kraft Lignin, pp. 75–77 and 131–133.
Liginins: Occurrence, Formation, Structure and Reactions, Ed., Sarkanen et al., pp. 838–840.
Abstract for U.S. Pat. No. 3,695,152, Chemical Abstracts, vol. 78, (1973), 18690v, p. 165.
Abstract for Japanese Kokai No. 73 31,225, Chemical Abstracts, vol. 79, (1973), 43835z, p. 73.
Abstract for Japanese Kokai No. 75 97,622, Chemical Abstracts, vol. 84, (1976), 154772z, p. 292.

Primary Examiner—John Kight, III
Assistant Examiner—Amelia B. Yarbrough
Attorney, Agent, or Firm—Terry B. McDaniel; Richard L. Schmalz

[57] ABSTRACT

Cationic oil in water type bituminous-aggregate slurries capable of being worked are disclosed. The slurries contain a densely graded aggregate, from about 8% to about 20% of an aqueous emulsion based on the weight of the aggregate, wherein the emulsion is comprised of from about 55% to about 65% of bitumen based on the weight of the emulsion, from about 0.5% to about 2%, based on the weight of the emulsion, of the reaction products of one or more polyamines and a polycarboxylic acid of the general formula

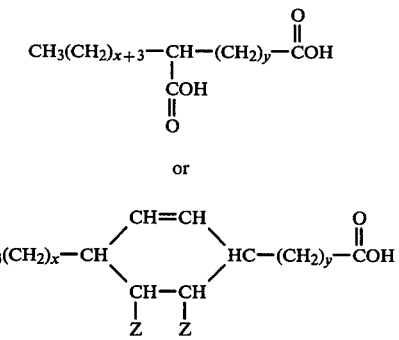

wherein x and y are integers from 3 to 9, x and y together equal 12, at least one Z is a carboxylic acid group and any remaining Z is hydrogen, as emulsifier, and water to make up 100% by weight. Additionally, from about 4% to about 16% water, based on the weight of the aggregate, is added to form a slurry of the aggregate and the emulsion; and up to 3% of an additive selected from the group consisting of lime and cement is employed to reduce the setting time of the mixture.

12 Claims, No Drawings

CATIONIC AQUEOUS BITUMINOUS EMULSION-AGGREGATE SLURRIES

BACKGROUND OF THE INVENTION

(1) Field of the Invention

The present invention relates to mixing-grade, quick setting and slow-setting cationic aqueous bituminous emulsion-aggregate paving slurry seal mixtures. These slurries are formed with cationic emulsions prepared by emulsifying bitumen, such as an asphalt, in water with a new kind of cation-active emulsifier which is the product of the reaction of a polyamine with a polycarboxylic acid of the general formula

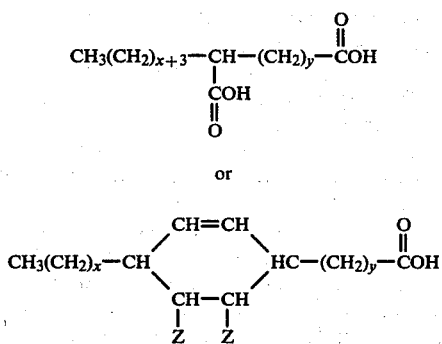

wherein x and y are integers from 3 to 9, x and y together equal 12, at least one Z is a carboxylic acid group and any remaining Z is hydrogen.

(2) Description of the Prior Art

Conventionally, emulsion slurry seals are formulated from (1) mineral aggregate which is a fine stone aggregate and/or mineral filler and (2) about 15% to about 25% by weight thereof of a mixing-grade, slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such admixture with aggregate, the aqueous emulison form of the bituminous material has been generally preferred because it is less hazardous and more economical to use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed.

Accordingly, an object of this invention is to provide a novel mixture of aggregate and bituminous emulsion.

A further object is to provide a mixture of the above character which is workable under a broad range of conditions.

Another object is to provide a mixture of cationic bituminous emulsion and aggregate whose setting time can be varied.

A particular object is to provide an aqueous bituminous emulsion fine-grained aggregate slurry mixture which deposits at a fairly rapid rate after being applied to the surface to be treated, and is usable for a longer period of time to enable application in slurry form.

SUMMARY OF THE INVENTION

The above objectives are met in the cationic aqueous bituminous emulsion-aggregate slurries formed with cationic emulsions prepared by emulsifying bitumen, such as an asphalt, in water with a new kind of cation-active emulsifier which is the product of the reaction of a polyamine with a polycarboxylic acid of the general formula

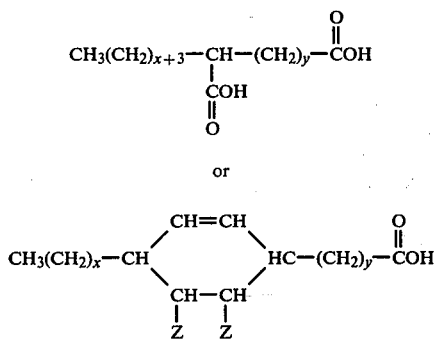

wherein x and y are integers from 3 to 9, x and y together equal 12, at least one Z is a carboxylic acid group and any remaining Z is hydrogen.

DESCRIPTION OF THE PREFERRED EMBODIMENTS

A typical cationic aqueous bituminous emulsion aggregate slurry is formulated in the laboratory with an amount of aggregate pre-wetted with water and admixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic or organic additive and emulsion components may be used. A typical unit is equipped with separate tanks for aggregate, water, additive and emulsion which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the cationic bituminous aggregate slurries of this invention.

The slurry of this invention broadly comprises aggregate and a bituminous emulsion made up of bitumen, water and, as cationic emulsifier, the reaction product of a polyamine and a polycarboxylic acid of the general formula

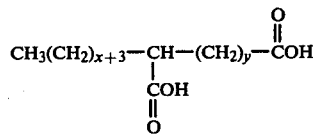

(I)

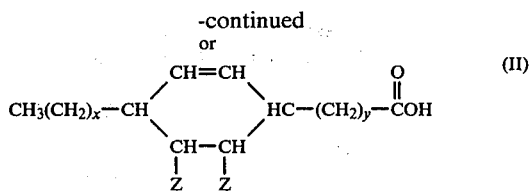

(II)

wherein x and y are integers from 3 to 9, x and y together equal 12, at least one Z is a carboxylic acid group and any remaining Z is hydrogen.

These acids are obtained by reaction of carbon monoxide and water with an unsaturated acid, preferably oleic acid, as described by Reppe and Kroper, in *Annalen der Chemie*, 582, 63–65 (1953) in the case of formula I, and by Diels-Alder addition of acrylic, metacrylic, fumaric or maleic acid to polyunsaturated fatty acids with conjugated double bonds in the case of formula II, forming a cyclohexene structure. These acids are referred to as $C_{19}$-dicarboxylic acid, $C_{21}$-dicarboxylic acid and $C_{22}$-tricarboxylic acid. Acids of this type are disclosed in U.S. Pat. Nos. 3,753,968 and 3,899,476 to Ward and U.S. Pat. No. 4,081,462 to Powers et al.

When these acids are heated with a polyamine, a variety of reaction products can be obtained. As a general example, the reaction products of the $C_{21}$-dicarboxylic acid and diethylene triamine are described. By blending two moles of diethylene triamine with one mole of $C_{21}$-dicarboxylic acid, a bis-diethylene diammonium salt is formed, which upon heating to 230° C. forms the diamidoamine of the formula

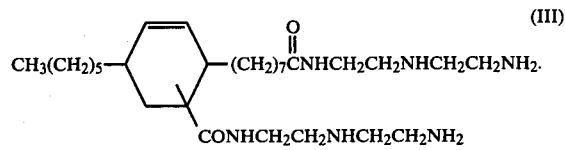

(III)

At the same time, in a competitive reaction, ring closure to an imidazoline structure is formed, which is a five membered ring containing two nitrogens, as shown in the following structure:

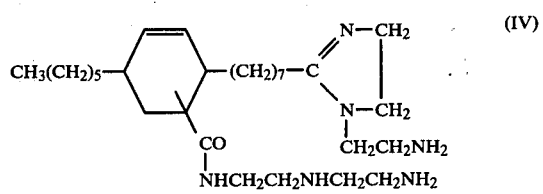

(IV)

Further prolonged heating of (IV) to 270°–280° C. gives the diimidazoline of the formula

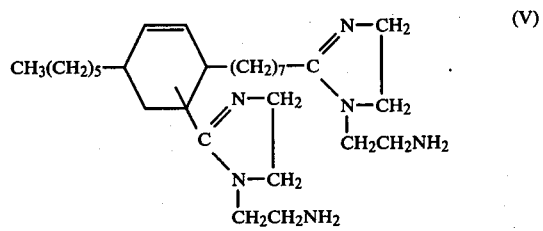

(V)

These products are, however, never obtained in high purity, since when a blend of two moles diethylene triamine and one mole $C_{21}$-dicarboxylic acid is heated slowly, some of the diethylene triamine distills with the water. Thus, upon prolonged heating, in addition to the products (III), (IV) and (V), polymers of the polyamide type are formed as byproducts. These byproducts can contain polyamidoamine structures and polyimidazoline structures as visualized by the formula:

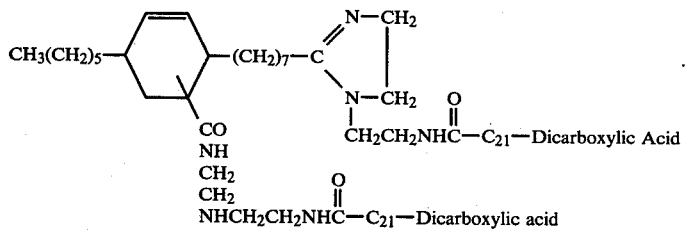

The formation of imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethyl propane diamine, N,N-diaminoethyl propane diamine and the N-aminoethyl or N,N-diaminoethyl substituted butane diamines, pentane diamines and hexane diamines, and N-hydroxy ethyl ethylene diamine. These compounds have the general formulae $H_2NCH_2CH_2NHR$             (VII)
$R = H—, CH_3—, C_2H_5—, C_3H_7—,$
     $—CH_2CH_2OH, —(CH_2CH_2NH)_xH$
$x = 1, 2, 3, 4, \ldots 10$
or
$R_1R_2N(CH_2)_yNHR_3$
$R_1 = H—, CH_3—, C_2H_5—, C_3H_7—, NH_2CH_2CH_2—,$
$R_2 = H—, CH_3—, C_2H_5—,$
$R_3 = H—, CH_3—, C_2H_5—, C_3H_7—, NH_2CH_2CH_2—,$
$y = 2, 3, 4, 5, 6.$ Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N,N-diethyl ethylenediamine; N-aminohexylhexane diamine-1,6.

Certain amidoamines or imidazolines with tertiary nitrogens, such as the reaction product of $C_{21}$ dicarboxylic acid and N,N-dimethylpropane diamine-1,3 of the formula

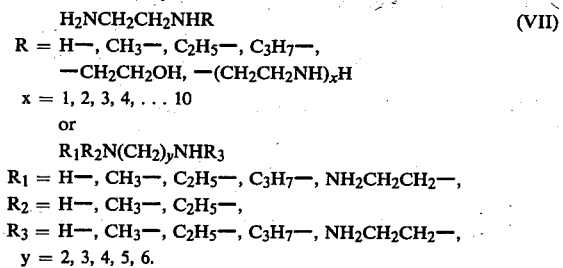

may be modified by further reaction with one or two moles of an alkylating agent such as methyl-, ethyl-, or benzyl halides, sulfates, phosphates, etc. The resulting compounds are classified as mono- or diquaternary ammonium salts. Their main characteristic is their solubility in aqueous systems without addition of acid, which is not the case with amines, amidoamines, or imidazolines. An example of this type of quaternary ammonium salt as prepared by reacting one mole of the formula (VIII) compound with two moles of methyl sulfate to provide the following structure:

(VI)

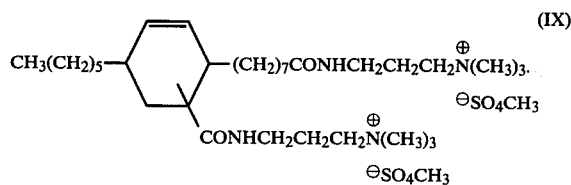

Further modifications of the above described mono-, di-, or polymeric amidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl amidoamines or imidazolines. If excess oxirane is reacted, polyethylene ether, polypropylene ether or polybutylene ether derivatives are obtained.

The reaction products of the $C_{19}$, $C_{21}$, or $C_{22}$ polycarboxylic acids disclosed herein with more than one polyamine also perform as emulsifiers for cationic aqueous bituminous emulsions. Particularly useful is the reaction product of the $C_{19}$, $C_{21}$ or $C_{22}$ polycarboxylic acid with one or more of the group selected from aminoethyl piperazine, triethylene tetramine, diethylene triamine, diethanolamine, aminoethyl ethanolamine, hydroxyethyl piperazine, tetraethylene pentamine and higher homologues.

A few of these $C_{21}$-dicarboxylic acid-polyamide reaction products, especially the diimidazolines are reported to be reactive resins and co-reactants with epoxy resins. Ethylene diamine, diethylene triamine, triethylene tetramine and tetraethylene pentamine are specifically mentioned. Reaction products of $C_{19}$-dicarboxylic acid are disclosed in U.S. Pat. No. 2,966,478 to Harrison, and of $C_{21}$-dicarboxylic acid in British Pat. No. 1,046,208 to Crawford and U.S. Pat. No. 4,013,601 to Alford.

The examples which follow are illustrative of emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions employed in the invention paving slurry seal mixtures, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1-10% by weight of the emulsion, preferably between 0.5-2% by weight of the emulsion. Dependent on the emulsifier, a slurry grade emulsion is obtained in a pH range of 2-7, with the optimum performance at a pH of about 2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the amidoamine or imidazoline in water to which a sufficient amount of a suitable acid, for instance, hydrochloric, sulfuric, and phosphoric acid or the like is added until the desired pH value below 7 is reached and a clear emulsifier solution is obtained. Thereafter, the soap solution which is preheated to about 55° C. and the fluid asphalt which is preheated to 120°-125° C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and organic salts, such as ammonium sulfate, or emulsifiers may be added to retard the set/break of the slurry system. Such additives shall comply with the requirements of ASTM D242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers. For instance, the setting times can be controlled with the concentration of emulsifier, the addition of lime, cement or other inorganic additive or an organic additive, which would alter the break characteristics of the slurry system. An organic additive-polymer latex may also be employed to strengthen the matrix. The organic additive is preferably added to the emulsion-aggregate slurry.

Either a mixture of tall oil fatty acids, preferably tall oil pitch, can be added to the bitumen (asphalt) prior to emulsification to improve break or improve the viscosity of the emulsion, or blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol. Combinations of amidoamines and imidazolines, based on fatty monocarboxylic acids, of various sources and the $C_{19}$- and $C_{21}$-dicarboxylic acids or $C_{22}$-tricarboxylic acid disclosed in this invention, can also be obtained by reacting suitable polyamines with a blend of fatty monocarboxylic and di- or tricarboxylic acids. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin, oxidized lignin, desulfonated sulfite lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids".

The emulsions prepared with the di- and tricarboxylic acid-polyamine condensates disclosed in this invention are stable and can be stored for a long period of time until required for use. The cationic aqueous bituminous emulsions employed in the invention slurries are slow-setting, mixing grade slurries under ASTM D2397; however, the set time may be shortened by adding lime or cement, providing an emulsion with quick-setting characteristics.

The practice of this invention may be seen in the following examples wherein the preparation of various types of the slurries of the invention is described.

EXAMPLE 1

The following variety of emulsifiers were prepared for emulsion-aggregate slurry testing.

Emulsifier 1

Two hundred grams $C_{21}$-dicarboxylic acid and 100 grams diethylene triamine were placed in a reaction vessel equipped with stirrer, reflux condenser and a Dean-Stark trap to collect distillate. The temperature was slowly raised to 230° C. After 28 mL distillate was collected, the reaction was terminated.

Emulsifier 2

The same amounts of starting materials were heated to 260°-270° C. After 40 mL distillate was collected, the reaction was terminated.

Emulsifier 3

One hundred-fifty grams $C_{21}$-dicarboxylic acid and 100 grams aminoethyl piperazine were heated to 220° C.

After 15 mL distillate was collected, the reaction was terminated.

Emulsifier 4

One hundred-fifty grams $C_{21}$-dicarboxylic acid and 100 grams triethylene tetramine were heated to 220° C. After 20 mL distillate was collected, the reaction was terminated.

Emulsifier 5

One hundred-fifty grams $C_{21}$-dicarboxylic acid and 100 grams tetraethylene pentamine were heated to 240° C. After 17 mL distillate was collected, the reaction was terminated.

Emulsifier 6

Fifty grams of $C_{22}$-tricarboxylic acid (obtained by Diels Alder addition of fumaric acid to $I_2$-isomerized tall oil fatty acids and purification by distillation to 85% tricarboxylic acid) and 50 grams diethylene triamine were heated to 260° C. After 24 mL distillate was collected, the reaction was terminated.

Emulsifier 7

A blend of 150 grams $C_{21}$-dicarboxylic acid and 50 grams tall oil fatty acid (L-5) was heated with 100 grams diethylene triamine to 210° C. After 22 mL distillate was collected, the reaction was terminated.

Emulsifier 8

One hundred grams of diethylene triamine were heated to 80° C. and 50 grams of dry kraft lignin (which was isolated from kraft black liquor with sulfuric acid at pH 2.5) were added and heated to 150° C. for 30 minutes. The reaction mixture was cooled to 120° C. and 200 grams $C_{21}$-dicarboxylic acid added. The reaction mixture was heated to 260° C. After 45 mL distillate was collected, the reaction was terminated.

Emulsifier 9

Twenty-five grams Vinsol and 50 grams diethylene triamine were heated to 180° C. After 20 minutes, 75 grams of $C_{21}$-dicarboxylic acid were added and heated to 265° C. After 23 mL distillate was collected, the reaction was terminated.

Emulsifier 10

One hundred-fifty grams of $C_{21}$-dicarboxylic acid and 100 grams of a blend of aminoethyl piperazine and triethylen tetramine were heated to 240° C. After 11 mL distillate was collected, the reaction was terminated.

EXAMPLE 2

A cationic aqueous bituminous emulsion was prepared employing each of the emulsifiers of Example 1 and aggregate mixing tests were performed with each emulsion as previously described.

First, cationic aqueous bituminous emulsions were prepared with 62% Exxon ® AC 20 asphalt (penetration value of 60 and viscosity of 2000±400 cps. at 60° C.), 1.25% emulsifier at pH 2.5 and water to make up 100% (percentages based on the weight of the emulsion).

Next, slurries were prepared by adding to one hundred grams of Camak aggregate (granite screenings) 16% of the cationic aqueous bituminous emulsion, 14% water and either 0% or 1% portland cement as set accelerator (percentages based on the weight of the aggregate).

For all emulsifiers tested, stable homogeneous slurry mixtures were achieved within one minute of mixing time.

EXAMPLE 3

This example illustrates the quick set times of the slurries prepared in Example 2, as well as the ability to control the set times with addition of a mineral filler (portland cement). The slurry set times were determined by the test procedures previously described, i.e., by blotting with a paper towel the exposed surface of the slurry spread in a mold on an asphalt felt. If no brown stain is transferred to the paper, the slurry is considered set. The set times are shown in the following table.

| Emulsifier | SLURRY SET TIMES (min) | |
|---|---|---|
| | No Cement | Cement |
| 1 | broke* | 2 |
| 2 | 90 | 2 |
| 3 | 75 | 5 |
| 4 | 187 | 2 |
| 5 | 110 | 5 |
| 6 | 180 | 8 |
| 7 | broke* | 2 |
| 8 | 90 | broke* |
| 9 | 170 | 2 |
| 10 | 90 | 2 |

*Slurry broke (emulsion cured/broke/set) before the one minute mix time.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A paving slurry seal mixture of a cationic aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of a cation-active emulsifier based on the weight of the emulsion, wherein the emulsifier is selected from the group consisting of reaction products of one or more polyamines reacted with a polycarboxylic acid corresponding to the formulae

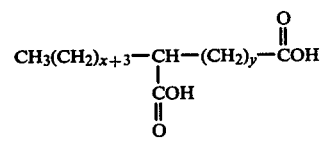

and

-continued

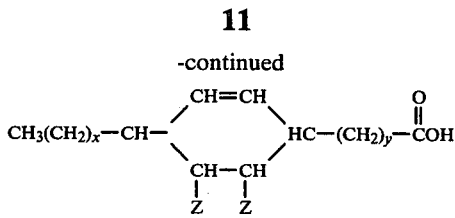

wherein x and y are integers from 3 to 9, x and y together equal 12, at least one Z is a carboxylic acid group and any remaining Z is hydrogen, and water to make up 100% by weight of the emulsion, the emulsion having a pH in the range of from 2–7; from about 4% to about 16% water, based on the weight of the mineral aggregate, added to form a slurry of the aggregate and the emulsion; and up to 3% of an inorganic or organic additive to reduce the setting time of the mixture.

2. The paving slurry seal mixture of claim 1 wherein the emulsion is a slow-setting, mixing grade composition.

3. The paving slurry seal mixture of claim 1 or 2 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

4. The paving slurry seal mixture of claim 1 or 2 including up to 90% of the total emulsifier formulation of one or more auxiliary emulsifiers selected from the group consisting of nitrogen derivatives of resin acids and nitrogen derivatives of kraft lignin.

5. The paving slurry seal mixture of claim 1 or 2 wherein the emulsifier formulation is prepared by reacting the polyamines with a blend of fatty monocarboxylic acids and the polycarboxylic acid.

6. The paving slurry seal mixture of claim 1 or 2 wherein the emulsifier formulation is prepared by reacting the polyamines with a blend of resin acids and the polycarboxylic acid.

7. The paving slurry seal mixture of claim 1 or 2 wherein the emulsifier formulation is prepared by reacting the polyamines with a blend of kraft lignin and the polycarboxylic acid.

8. The paving slurry seal mixture of claim 1 or 2 comprising from about 55% to 65% bitumen by weight of the emulsion, from about 0.5% to 2.0% emulsifier by weight of the emulsion, and water to make up 100% by weight, the emulsion having a pH of about 2.5.

9. The paving slurry seal mixture of claim 1 wherein a mixture of tall oil fatty acids is added to the bitumen prior to emulsification.

10. The paving slurry seal mixture of claim 9 wherein the tall oil fatty acids mixture is tall oil pitch.

11. The paving slurry seal mixture of claim 1 or 2 wherein the polyamines are selected from the group consisting of aminoethyl piperazine, triethylene tetramine, diethylene triamine, aminoethyl ethanolamine, hydroxyethyl piperazine and tetraethylene pentamine.

12. The paving slurry seal mixture of claim 1 or 2 wherein the inorganic additive is selected from the group consisting of portland cement, hydrated lime, limestone dust, and fly ash.

* * * * *